(12) United States Patent
Unno (10) Patent No.: US 9,311,580 B2
(45) Date of Patent: Apr. 12, 2016

(54) PRINTING APPARATUS, METHOD FOR CONTROLLING A PRINTING APPARATUS, AND STORAGE MEDIUM FOR PERFORMING READING AT A READING POSITION, GENERATING IMAGE DATA AND PRINTING AN IMAGE BASED ON THE IMAGE DATA

(71) Applicant: CANON KABUSHIKI KAISHA, Tokyo (JP)

(72) Inventor: Koichi Unno, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/515,496

(22) Filed: Oct. 15, 2014

(65) Prior Publication Data

US 2015/0109628 A1 Apr. 23, 2015

(30) Foreign Application Priority Data

Oct. 17, 2013 (JP) .................. 2013-216481

(51) Int. Cl.
*G06K 15/00* (2006.01)
*H04N 1/00* (2006.01)
*H04N 1/04* (2006.01)

(52) U.S. Cl.
CPC .......... *G06K 15/408* (2013.01); *H04N 1/00092* (2013.01)

(58) Field of Classification Search
CPC .......... H04N 1/00925; H04N 1/00005; H04N 1/00013; H04N 1/0005; H04N 1/00687; H04N 1/00909; H04N 1/00015; H04N 2201/0082; H04N 2201/0094; G06K 15/408

USPC .............. 358/1.1, 1.9, 1.12, 1.14, 1.15, 1.18, 358/474, 496, 498

See application file for complete search history.

(56) References Cited

U.S. PATENT DOCUMENTS

| 2002/0075527 | A1* | 6/2002 | Ito ................................. 358/496 |
| 2004/0125420 | A1* | 7/2004 | Tsutsumi ....................... 358/498 |
| 2005/0157351 | A1* | 7/2005 | Matsuda ........................ 358/474 |
| 2006/0028696 | A1* | 2/2006 | Michiie et al. ................ 358/474 |
| 2008/0225355 | A1* | 9/2008 | Kagami ......................... 358/496 |
| 2014/0268256 | A1* | 9/2014 | Mayama ....................... 358/496 |
| 2015/0070736 | A1* | 3/2015 | Yoneyama .................... 358/504 |

FOREIGN PATENT DOCUMENTS

JP 2004-104587 A 4/2004

* cited by examiner

*Primary Examiner* — Gabriel Garcia
(74) *Attorney, Agent, or Firm* — Canon USA, Inc. IP Division (57) ABSTRACT

Depending on a sheet used in printing, in some cases, a user desires to perform printing without an effect of an abnormal pixel, and in other cases, the user desires prompt execution of the reading of a document. Therefore, a method includes determining whether image data includes an abnormal pixel, the image data being generated by a reading unit performing reading with no document placed at a reading position, and performing control so that the determining is performed in a case where a sheet on which an image is to be printed by a printing unit is a sheet that is to be subjected to the determining, and performing control so that the determining is not performed in a case where the sheet on which the image is to be printed by the printing unit is a sheet that is not to be subjected to the determining.

16 Claims, 11 Drawing Sheets

| SHEET HOLDING UNIT | SIZE | SHEET TYPE ID |
|---|---|---|
| 1 | A4 | 1 |
| 2 | A3 | 4 |
| MANUAL FEEDING TRAY | A4 | 3 |
| ... | ... | ... |

FIG.7B

| SHEET TYPE ID | NAME | GRAMMAGE | SURFACE PROPERTY | SHAPE | ADJUSTMENT VALUE |
|---|---|---|---|---|---|
| 1 | FOR IN-HOUSE USE | 110 | THICK PAPER | NORMAL | 0 |
| 2 | FOR FAX | 64 | RECYCLED PAPER | NORMAL | 2 |
| 3 | FOR PAMPHLET | 70 | DOUBLE-SIDED COATED SHEET | NORMAL | 2 |
| 4 | FOR PRESENTATION | 200 | FILM | NORMAL | 2 |
| ... | ... | ... | ... | ... | ... |

FIG.8

⚠ DOCUMENT MAY NOT BE READ CLEARLY (STREAKS MAY APPEAR). CLEAN THE ILLUSTRATED STRIP OF GLASS SURFACE WITH A CLOTH DAMPENED WITH WATER AND SQUEEZED.

800

CLOSE ↵

🔲 SYSTEM MANAGEMENT MODE.　　　🔑 LOG OUT

FIG.10

PRINTING APPARATUS, METHOD FOR CONTROLLING A PRINTING APPARATUS, AND STORAGE MEDIUM FOR PERFORMING READING AT A READING POSITION, GENERATING IMAGE DATA AND PRINTING AN IMAGE BASED ON THE IMAGE DATA

BACKGROUND OF THE INVENTION

1. Field of the Invention

The present invention relates to a printing apparatus configured to execute processing of detecting dirt and dust on a member of the printing apparatus (e.g., a document glass, a document glass surface, a document guide plate, etc.), a method for controlling the printing apparatus, and a storage medium.

2. Description of the Related Art

Conventionally, there has been known a technique for reading an image on a surface of a conveyance belt or an image on a surface of a rotating conveyance roller a predetermined number of times to detect dirt and dust on a document glass disposed between an exposure system and a document to be conveyed. In the technique, the processing of detecting dirt and dust on the document glass is executed when a power source is turned on, when the reading of all documents placed on a document tray is completed, or between the reading of a plurality of documents. Then, in a case where it is determined that dirt or dust is detected on the document glass, a filter constant to be applied to image data of a read document is changed to make an abnormal pixel caused by the dirt or dust on the document glass unnoticeable (refer to Japanese Patent Application Laid-Open No. 2004-104587).

However, the case where the processing of detecting dirt and dust on the document glass is executed takes longer time than a case where no detection processing is executed. Meanwhile, depending on a sheet to be used in printing, in some cases, a user desires to perform printing without an effect of an abnormal pixel after execution of the processing of detecting dirt and dust on the document glass, and in other cases, the user desires prompt execution of the reading of a document without execution of the processing of detecting dirt and dust on the document glass.

SUMMARY OF THE INVENTION

According to an aspect of the present invention(s), a printing apparatus includes a printing unit configured to print an image on a sheet based on first image data generated by a reading unit reading an image of a document, a determining unit configured to determine whether second image data includes an abnormal pixel, the second image data being generated by the reading unit performing reading with no document placed at a reading position (e.g., of the printing apparatus), and a control unit configured to control the determining unit to perform the determination in a case where the sheet on which the image is to be printed by the printing unit is a sheet that is to be subjected to the determination by the determining unit, and to control the determining unit not to perform the determination in a case where the sheet on which the image is to be printed by the printing unit is a sheet that is not to be subjected to the determination by the determining unit. A method for controlling a printing apparatus and a computer-readable storage medium storing a computer program for controlling a printing apparatus are also provided.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings. It is to be understood that the following exemplary embodiments are not intended to limit the scope of the invention set forth in the appended claims and that all combinations of features described in the exemplary embodiments are not necessarily essential to the technical solution provided by the present invention.

Figure 1:
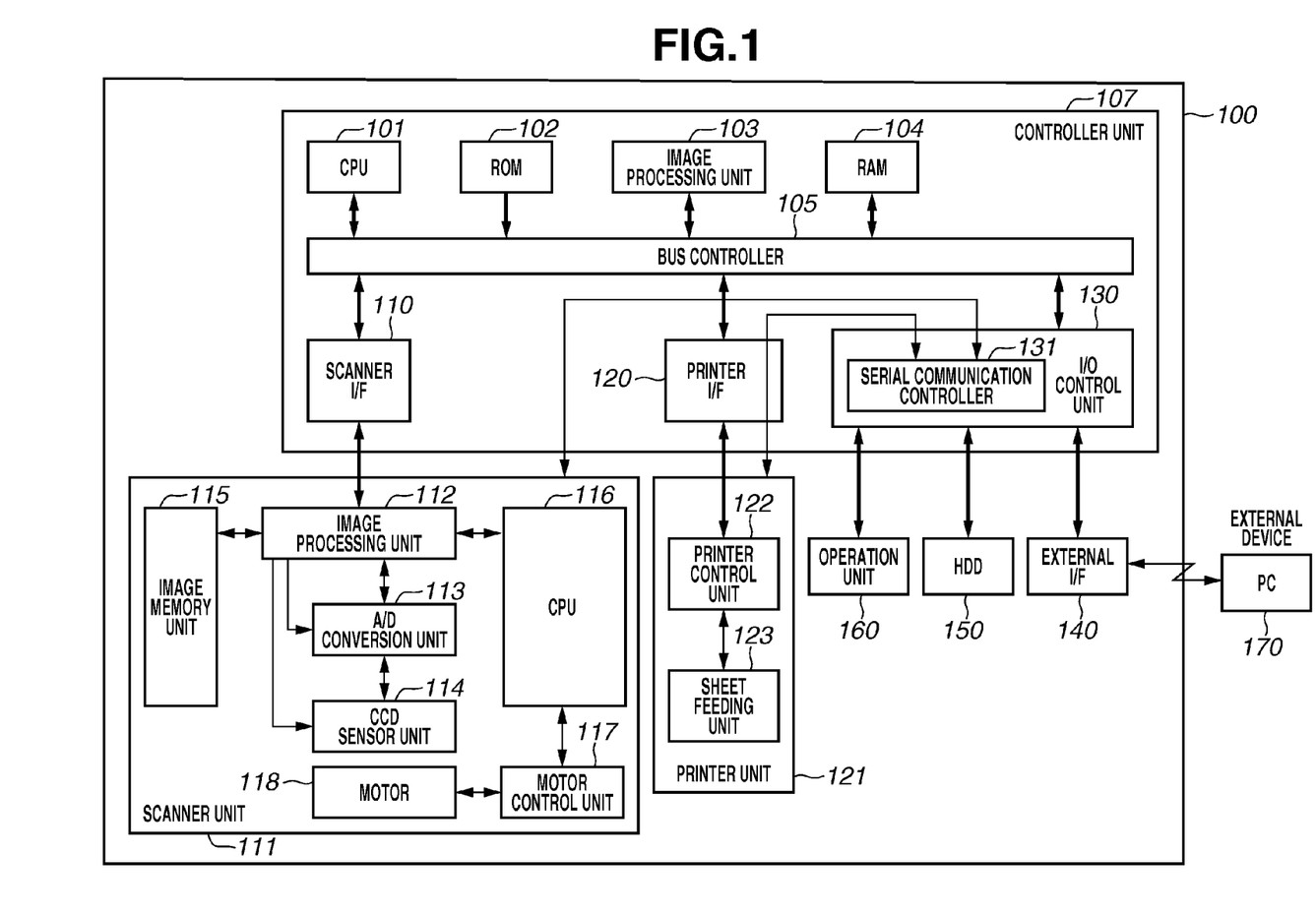
FIG. 1 is a block diagram illustrating a configuration of a printing system according to an exemplary embodiment.

The following describes a printing system according to a first exemplary embodiment of the present invention, with reference to FIG. 1. The printing system according to the present exemplary embodiment includes an MFP 100 and a personal computer (PC) 170. The MFP 100 is an example of an image reading apparatus configured to read an image of a document. The PC 170 is an external information processing apparatus. The MFP 100 has an image reading function of reading a document to generate image data, and a printing function (also referred to as an image formation function) of printing the generated image data on a sheet. The printing function is required to enable at least either color or monochrome printing. In other words, the MFP 100 serves as a printing apparatus as well as an image reading apparatus.

While the present exemplary embodiment describes the MFP 100 as an example of the image reading apparatus, the image reading apparatus may be any scanner having an image reading function, that is, a scanner capable of reading a document to generate image data, and sending the generated image data to the PC 170. Alternatively, the MFP 100 may be a scanner that stores the generated image data in a removable external memory such as a universal serial bus (USB) memory instead of sending the generated image data to the PC 170.

The MFP 100 is connected to the PC 170 via a local area network (LAN) or a wide area network (WAN) such as the Internet to communicate with the PC 170. While the present exemplary embodiment describes that the MFP 100 and the PC 170 are connected via a wired LAN, the MFP 100 and the PC 170 may be connected via a USB cable. Alternatively, the MFP 100 and the PC 170 may be configured so that communication can be performed therebetween via wireless communication such as wireless fidelity (Wi-Fi) and Bluetooth (registered trademark).

The PC 170 generates image data using application software and sends the generated image data to the MFP 100. While the present exemplary embodiment describes the PC 170 as an example of the external information processing apparatus, the information processing apparatus is not limited to the PC 170 and may be a portable information terminal such as a personal digital assistant (PDA) and a smartphone.

The MFP 100 according to the present exemplary embodiment includes a controller unit (control unit) 107, a scanner unit 111, a printer unit 121, an external interface (I/F) 140, a hard disk (hereinafter referred to as "HDD") (storing unit) 150, and an operation unit 160, which will be described below. They are electrically connected to send and receive a control command and data to and from one another. The external I/F 140, which is an example of a communication unit, is an interface for sending and receiving image data to and from an external device. Examples of an external device include a facsimile, a network connection device, and an external dedicated apparatus.

The controller unit 107 includes, as a plurality of function blocks, a central processing unit (CPU) 101, a read-only memory (ROM) 102, an image processing unit 103, a random-access memory (RAM) 104, a scanner I/F 110, a printer I/F 120, and an input/output (I/O) control unit 130. They are electrically connected via a bus controller 105 to send and receive a control command and data to and from one another.

The CPU 101 controls processing, operations, and the like of the respective units included in the MFP 100.

The ROM 102 is a read-only memory and stores programs in advance such as a boot sequence and font information.

On the other hand, the RAM 104 is a readable and writable memory and stores image data sent from the scanner unit 111 or the external I/F 140, various programs, setting information, and the like. In the present exemplary embodiment, the RAM 104 is, for example, a dynamic random access memory (DRAM).

The ROM 102 stores various control programs that are to be executed by the CPU 101 and are necessary for the execution of various types of processing in flow charts described below. The ROM 102 further stores display control programs for displaying various user interface screens (hereinafter referred to as "UI screens") on a display unit of the operation unit 160 including a UI screen. The CPU 101 reads and executes the programs stored in the ROM 102 to cause the MFP 100 to execute various operations.

The ROM 102 further stores programs and the like for causing the CPU 101 to execute operations of interpreting page description language (hereinafter referred to as "PDL") data received from an external device via the external I/F 140 and rasterizing the data into raster image data (bitmap image data). In a similar manner, the ROM 102 further stores programs and the like for causing the CPU 101 to interpret and process a print job received from an external device via the external I/F 140. These are processed by software.

The scanner I/F 110 is an interface for connecting to the scanner unit 111, which is an image reading device. The printer I/F 120 is an interface for connecting to the printer unit 121, which is an image output device. The controller unit 107 performs synchronous/asynchronous conversion and control of image data via the scanner I/F 110 or the printer I/F 120.

The MFP 100 further includes a nonvolatile memory such as the HDD 150 capable of internally storing a plurality of jobs to be processed. The HDD 150 can store system software, image data to be converted into RGB signals by an image processing unit 112 described below, and the like. The HDD 150 is configured to be capable of storing a plurality of types of data such as print data of a job to be processed. The controller unit 107 stores in the HDD 150 a job to be processed that is input via various input units such as the scanner unit 111 and the external I/F 140. The controller unit 107 reads the job from the HDD 150 and then outputs the job to the printer unit 121 described below to print the job. The controller unit 107 also performs control so that the job read from the HDD 150 can be sent to an external device via the external I/F 140. The controller unit 107 thus executes various types of output processing of the job to be processed that is stored in the HDD 150. While the present exemplary embodiment describes the HDD 150 as an example of a large-capacity and nonvolatile storing device, the storing device may be a nonvolatile memory such as a solid state drive (SSD) that is a large-capacity and nonvolatile storing device.

The MFP 100 further includes the operation unit 160, which is an example of a user interface unit, including the display unit. The operation unit 160 of the MFP 100 according to the present exemplary embodiment includes the display unit (not illustrated) and hard keys (not illustrated). The display unit includes a liquid crystal display (LCD) and a touch panel sheet including a transparent electrode (which can be a capacitance electrode) and being placed on the LCD. The LCD displays an operation screen or the state of the MFP 100. The operation unit 160 has a function of receiving various settings from the user via the operation screen or the hard keys and also a function of providing information to the user.

Meanwhile, the scanner unit 111 includes the image processing unit 112, an analog/digital (A/D) conversion unit 113, a charge-coupled device (CCD) sensor unit 114, an image memory unit 115, a CPU 116, a motor control unit 117, and a motor 118. The scanner unit 111 is electrically connected via a serial communication controller 131 of the I/O control unit 130.

The motor 118 is driven to move an exposure unit 213 and a mirror unit 214, which will be described below, of the scanner unit 111. While the following describes the case in which a command for moving the exposure unit 213 and the mirror unit 214 in the scanner unit 111 is given to the motor 118 by the controller unit 107 via the motor control unit 117, this is not a limiting case. Alternatively, the CPU 116 of the scanner unit 111 may directly give the motor 118 a command for moving the exposure unit 213 and the mirror unit 214 in the scanner unit 111.

Image data of a document read by the CCD sensor unit 114 is converted from analog signals into digital signals by the A/D conversion unit 113. Thereafter, the digital signals are converted into RGB signals by the image processing unit 112. The RGB signals are temporarily stored in the RAM 104 via the scanner I/F 110 and the bus controller 105 of the controller unit 107. Then, according to the control by the CPU 101 of the controller unit 107, the image data is stored in the HDD 150 via the I/O control unit 130.

In the case of printing the image data stored in the HDD 150, the image data stored in the HDD 150 is temporarily stored in the RAM 104 according to the control by the CPU 101 of the controller unit 107. Then, the temporarily stored image data undergoes color space conversion such as RGB-to-CMYK conversion executed by the image processing unit 103, and then the resultant image data is transferred to the printer unit 121 via the printer I/F 120.

The printer unit 121 includes a printer control unit 122 configured to control communication with the controller unit 107. The printer unit 121 further includes a sheet feeding unit 123 including a plurality of sheet holding units that hold sheets to be used in printing. The printer unit 121 is electrically connected via the serial communication controller 131 of the I/O control unit 130.

The printer unit 121 executes printing processing of a job to be printed that is stored in the HDD 150. A command for printing image data is given to the printer unit 121 by the controller unit 107 via the printer control unit 122. Based on the image data, the printer unit 121 forms (prints) an image with toner on a sheet fed from the sheet feeding unit 123 and then transfers and fixes the image data thereto.

On the other hand, in the case of sending the image data stored in the HDD 150 to the PC 170, the image data is sent to the PC 170, which is an external device, via the external I/F 140.

Figure 2:
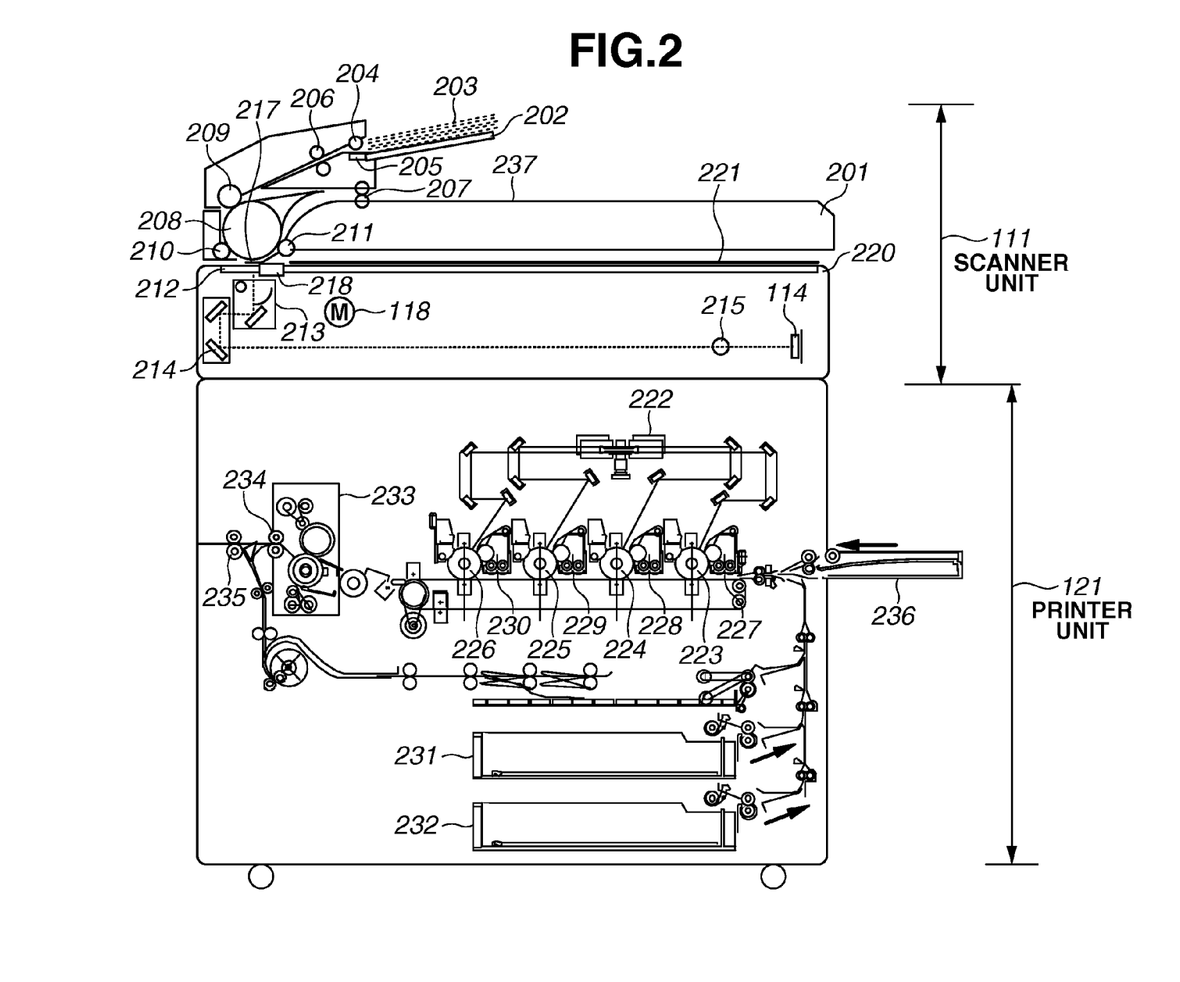
FIG. 2 is a cross-sectional view illustrating a configuration of a multifunctional peripheral (MFP) according to the present exemplary embodiment.

Next, the following provides the explanation about a cross sectional view of the scanner unit 111 and the printer unit 121 illustrated in FIG. 1, with reference to FIG. 2.

The scanner unit 111 reads information about a document 203 by relatively moving the document 203 with respect to the exposure unit 213. More specifically, in the scanner unit 111, the document 203 placed on a document tray 202 is conveyed one by one by a pair of a document feeding roller 204 and a separating pad 205. Then, the document 203 conveyed one by one is sent to the inside of the scanner unit 111 by an intermediate roller pair 206, conveyed by a larger roller 208 and a roller 209, and further conveyed by the larger roller 208 and a roller 210. Then, the document 203 conveyed between a document glass 212 and a document guide plate 217 while being in contact with the document glass 212 is passed through a jump plate 218, further conveyed by the larger roller 208 and a roller 211, and then discharged to a document discharge tray 237 by a document discharge roller pair 207.

When the document 203 passes through the document glass 212, a surface of the document 203 that is in contact with the document glass 212 is exposed to light by the exposure unit 213 to obtain reflected light from the document 203, and the reflected light is transmitted to the mirror unit 214 via a plurality of mirrors. The transmitted reflected light passes through a lens 215, is condensed, and then converted into electric signals by the CCD sensor unit 114. Image data output from the CCD sensor unit 114 undergoes the predetermined processing described above and then is transferred to the controller unit 107. The document guide plate 217 is coated in advance with a uniform white coating, and before the conveyance of the document 203 is started, the CCD sensor unit 114 reads the document guide plate 217 with no sheet being conveyed. Image information about the read document guide plate 217 is used in a series of processes for determining detection of dirt and dust on one or more members of the printing apparatus, such as, the document glass 212, the document guide plate 217, etc. (hereinafter referred to as "dust detection processing"). Details of the dust detection processing will be described below with reference to FIG. 4.

While the foregoing describes that an optical system included in the scanner unit 111 of the MFP 100 according to the present exemplary embodiment is a reducing optical system in which reflected light from a document forms an image on a CCD sensor, this is not a limiting case. The optical system included in the scanner unit 111 may be an equal-magnification optical system in which reflected light from a document forms an image on a contact image sensor (CIS).

Then, the image data that is output from the controller unit 107 and transferred to the printer unit 121 is converted by a laser unit 222 into laser light corresponding to the image data. The laser light is applied to photosensitive drums 223 to 226 to form latent images corresponding to the laser light on the photosensitive drums 223 to 226. Developer is adhered to each of the latent image parts of the photosensitive drums 223 to 226 by each of developing units 227 to 230. A color MFP includes four photosensitive drums and four developing units respectively for cyan, yellow, magenta, and black.

The printer unit 121 includes sheet feeding cassettes 231 and 232, each of which is in the shape of a drawer, and a manual feeding tray 236, as the sheet holding units included in the sheet feeding unit 123. Each of the sheet feeding cassettes 231 and 232 and the manual feeding tray 236 can hold a plurality of sheets. The printer unit 121 may include a plurality of sheet feeding cassettes and manual feeding trays or may include at least either one of a sheet feeding cassette and a manual feeding tray.

The printer unit 121 feeds a sheet from the sheet feeding cassette 231 or 232, or the manual feeding tray 236, transfers the developer adhering to each of the photosensitive drums 223 to 226 to the sheet, and then conveys the sheet to a fixing unit 233 to fix the developer onto the sheet by heating and pressing. The sheet having passed through the fixing unit 233 is discharged to the outside of the MFP 100 by conveyance roller pairs 234 and 235.

While the present exemplary embodiment describes the case of using the color MFP including four photosensitive drums and four developing units, the present invention is also applicable to a monochrome MFP including one photosensitive drum and one developing unit. Further, while the present exemplary embodiment describes the electrophotographic method of printing an image on a sheet, an inkjet method or any other methods may be used so long as the method can print an image.

Figure 5:
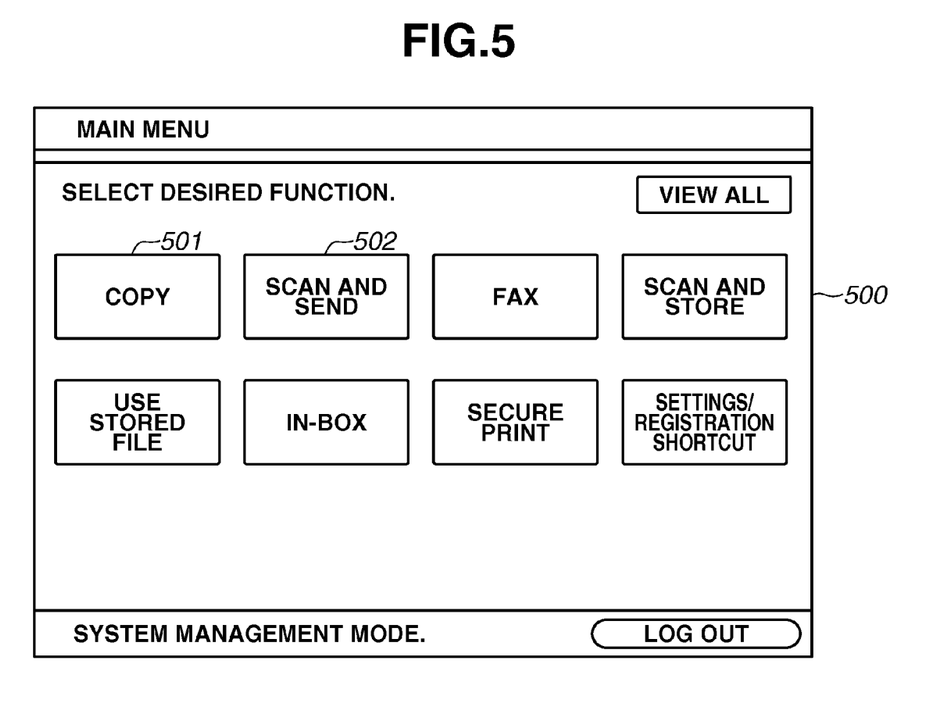
FIG. 5 illustrates an example of a main screen, displayed on the MFP according to the first exemplary embodiment, for transition to screens for executing various functions.

FIG. 5 illustrates an example of a main screen 500 displayed on the operation unit 160 of the MFP 100 according to the first exemplary embodiment. The main screen 500 includes a list of selection buttons for invoking various functions such as a copy function 501 and a scan-and-send function 502. The user presses a desired selection button to change the screen to a screen for using any of the various functions. For example, if the user selects the copy function 501, the screen changes to an execution screen 600 illustrated in FIG. 6A for using the copy function 501.

Figure 6A:
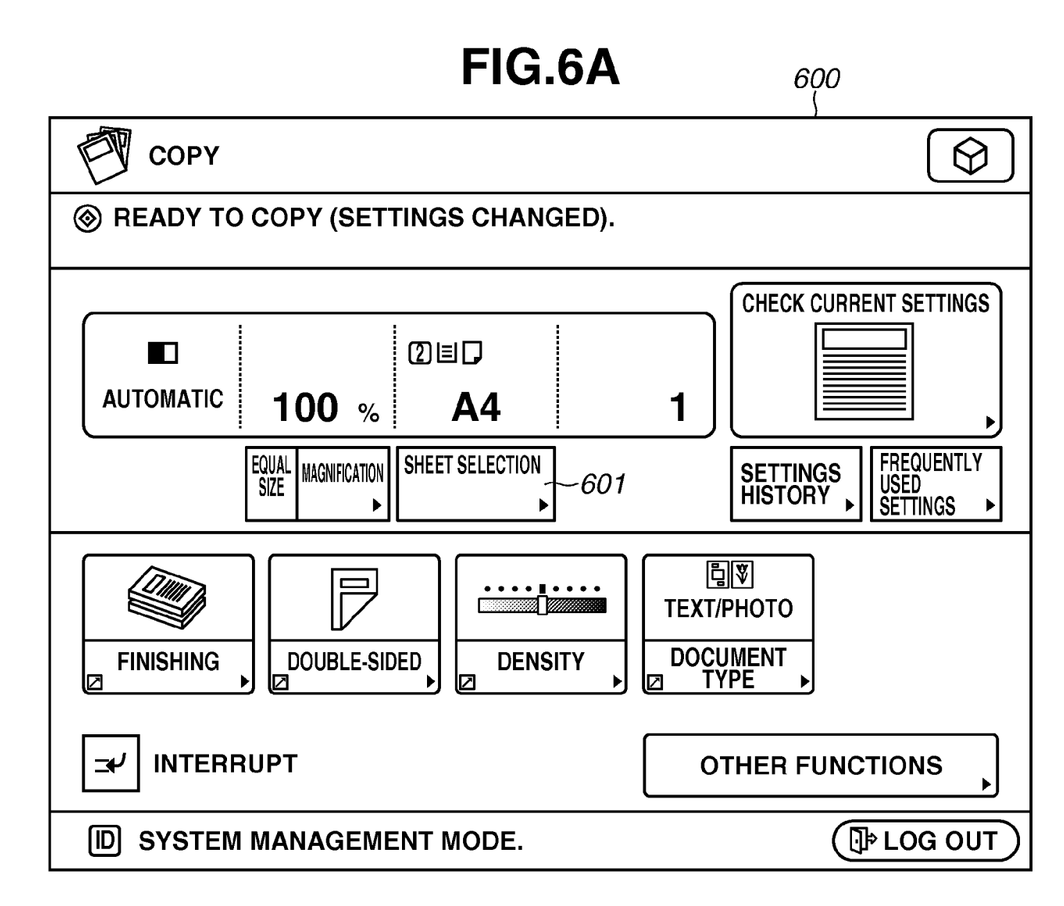
FIGS. 6A and 6B respectively illustrate an example of an execution screen for using a copy function, and an example of a sheet feeding setting screen for selecting a sheet to be used in printing, displayed on the MFP according to the first exemplary embodiment.
Figure 6B:
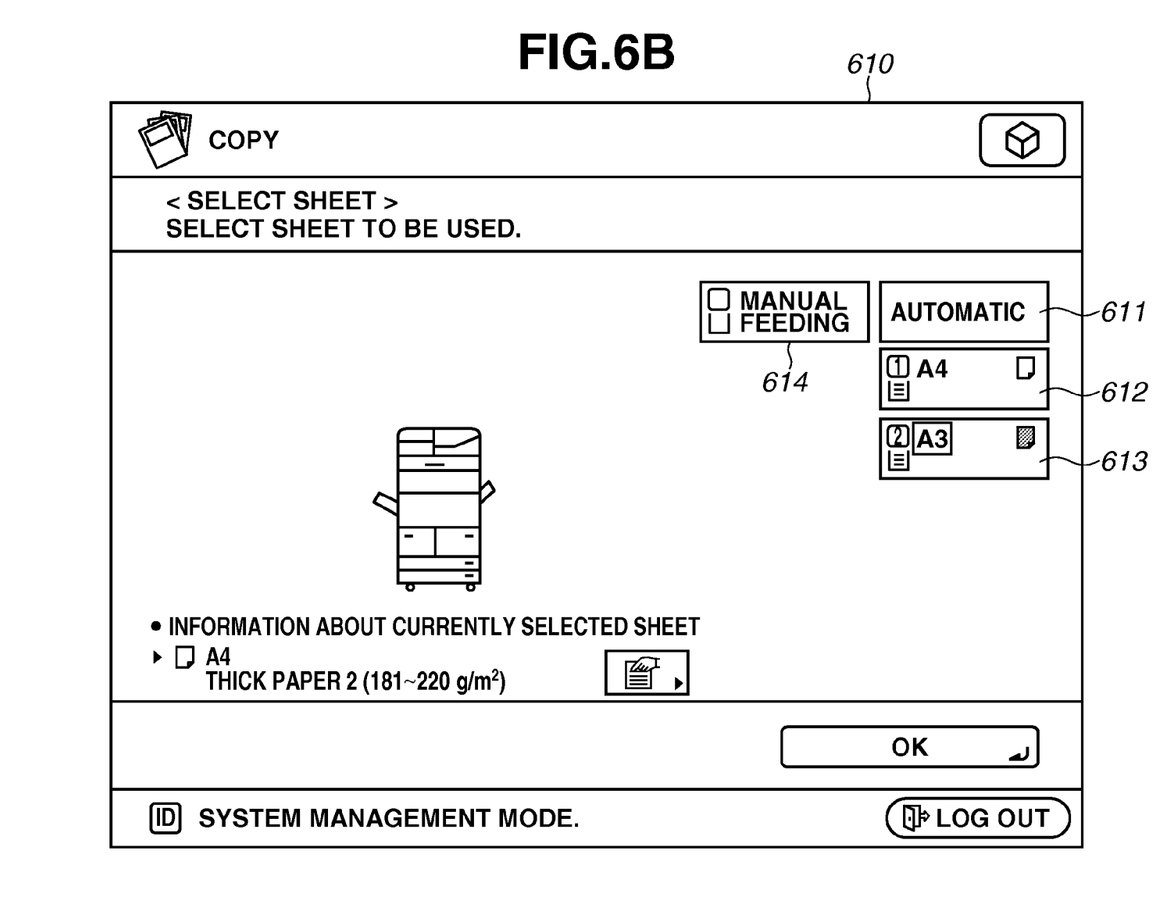

If the user presses a sheet selection 601 on the execution screen 600 illustrated in FIG. 6A, the execution screen 600 changes to a sheet feeding setting screen 610 illustrated in FIG. 6B for selectively setting a feeding source of a sheet to be used in a job, and the user can select a feeding source of the sheet to be used in the job.

In the example illustrated in FIG. 6B, if the user selects an automatic feeding selection 611 as a sheet feeding mode, attribute information about a sheet stored in each sheet holding unit is referred to. Then, a sheet holding unit that stores attribute information about the sheet to be used in the job is automatically selected as a feeding source of the sheet to be used in the job.

Figure 7A:
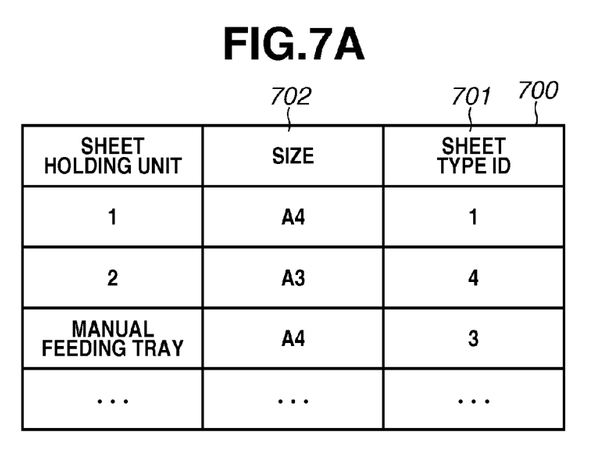
FIGS. 7A and 7B respectively illustrate an example of attribute information about a sheet stored for each sheet holding unit, and an example of attribute information about a sheet stored for each sheet type identification (ID), in the MFP according to the first exemplary embodiment.

Attribute information about sheets stored in each sheet holding unit is stored in a registration table 700 illustrated in FIG. 7A. The registration table 700 includes information about a sheet size 702 and a sheet type ID 701 of sheets stored in each sheet holding unit. The information registered in the registration table 700 is stored in the HDD 150. On the other hand, if the sheet feeding mode is set to a sheet holding unit 1 designation (612), a sheet holding unit 1 (the sheet feeding cassette 231) is selected as a designated sheet feeding source for the job. On the yet other hand, if the sheet feeding mode is set to a sheet holding unit 2 designation (613), a sheet holding unit 2 (the sheet feeding cassette 232) is selected as a designated sheet feeding source for the job. In addition, if the sheet feeding mode is set to a manual feeding tray designation (614), the manual feeding tray 236 is selected as a designated sheet feeding source for the job.

Figure 7B:
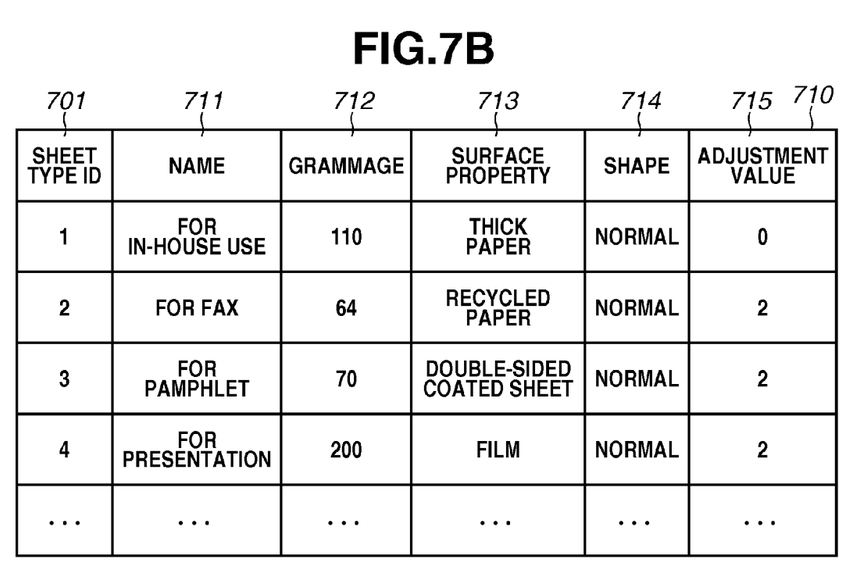

Attribute information about a sheet for each sheet type ID 701 is stored in a management table 710 illustrated in FIG. 7B. Using the sheet type ID 701 as a key, the management table 710 stores information about, for example, a sheet name 711, a grammage 712, a sheet surface property 713, a shape 714, an adjustment value 715, and the like. The adjustment value 715 is a parameter for the adjustment of the photosensitive drums 223 to 226, the developing units 227 to 230, the fixing unit 233, and the conveyance roller pairs 234 and 235. The information managed by the management table 710 may be stored in the HDD 150 or imported from an external device such as the PC 170.

For example, the sheet size 702 registered in the sheet holding unit 1 is A4. Further, the management table 710 is referred to for the attribute information about the sheet of the sheet type ID 701 (=1) to find out that the sheet grammage 712 is "110 g/m$^2$," the sheet surface property 713 is "thick paper," and the shape 714 is "normal."

The first exemplary embodiment will describe below the case in which after a copy job execution command is received, attribute information about a sheet to be used in the printing is acquired, and whether to execute the dust detection processing is controlled according to the acquired attribute information about the sheet.

Figure 3:
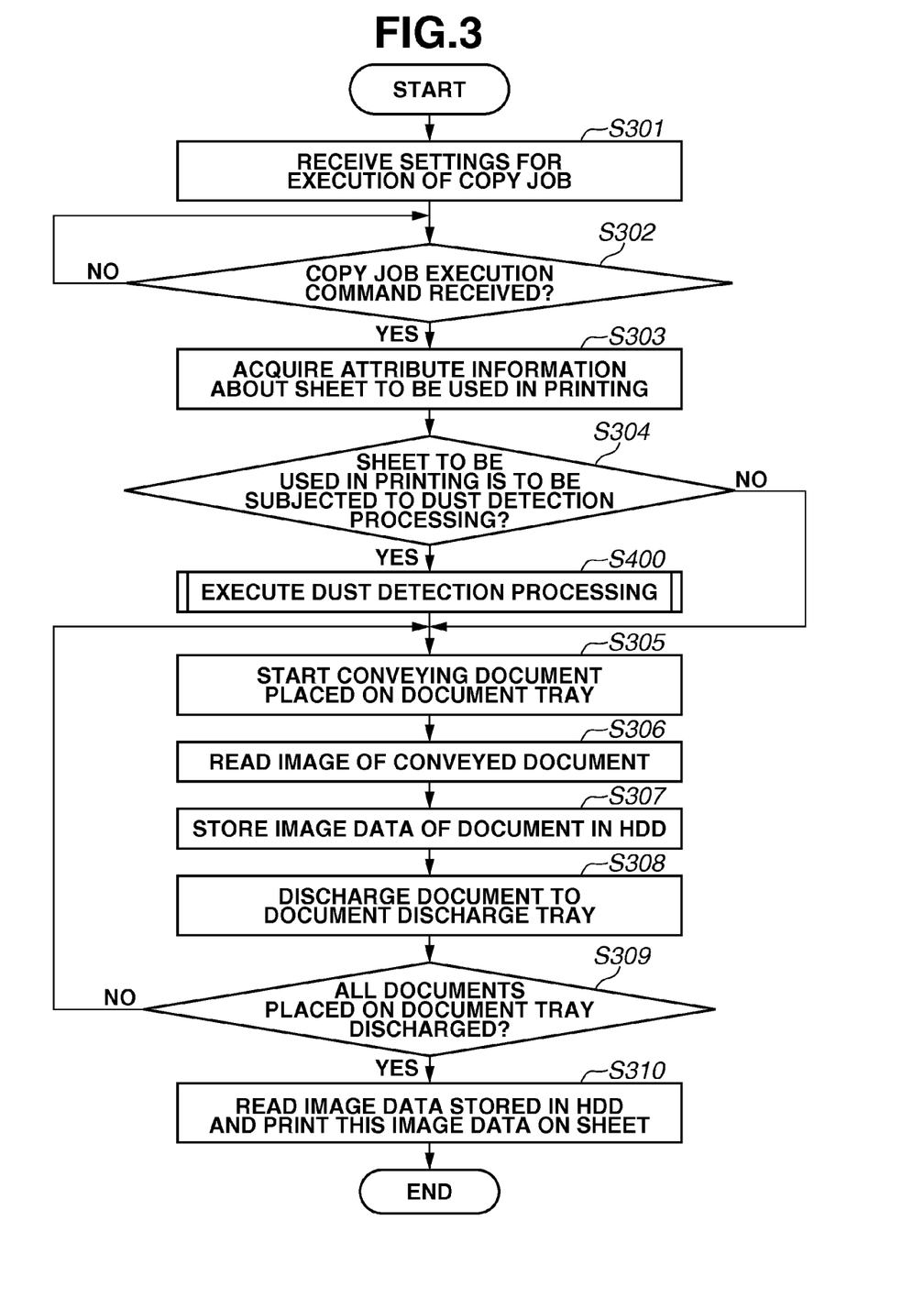
FIG. 3 is a flow chart illustrating a series of processes performed by an MFP according to a first exemplary embodiment to execute a copy job.

The following describes a series of processes performed by the MFP 100 according to the first exemplary embodiment to execute a copy job, with reference to a flow chart illustrated in FIG. 3. The processing illustrated in FIG. 3 is started with the execution screen 600 illustrated in FIG. 6A being displayed on the operation unit 160 in response to the selection mode of the copy function 501 being pressed on the main screen 500 illustrated in FIG. 5. Each process in the flow chart illustrated in FIG. 3 is realized by the CPU 101 executing a program that is read from the ROM 102 or the HDD 150 and loaded into the RAM 104.

In step S301, the CPU 101 receives settings for the execution of a copy job on the execution screen 600 illustrated in FIG. 6A, and then the processing proceeds to step S302. Examples of the settings for the copy job execution include the settings for the sheet selection 601, magnification change, density adjustment, and document type.

In step S302, the CPU 101 determines whether a copy job execution command is received in response to a start key (not illustrated) of the operation unit 160 being pressed. If the CPU 101 determines that the copy job execution command is received (YES in step S302), the processing proceeds to step S303. On the other hand, if the CPU 101 determines that no copy job execution command is received (No in step S302), the CPU 101 repeats the process of step S302 until a copy job execution command is received.

In step S303, the CPU 101 executes a copy job to acquire attribute information about a sheet to be used in printing, and then the processing proceeds to step S304. Examples of attribute information acquired in step S303 include the sheet grammage 712, the sheet surface property 713, and the like.

In step S304, according to the attribute information acquired in step S303, the CPU 101 determines whether the sheet to be used in printing is to be subjected to the dust detection processing.

For example, if the sheet surface property 713 of a sheet is "double-sided coated sheet" or "film," the sheet is set as a sheet that is to be subjected to the dust detection processing. On the other hand, if the sheet surface property 713 of a sheet is "thick paper" or "recycled paper," the sheet is set as a sheet that is not to be subjected to the dust detection processing. While the present exemplary embodiment describes the case in which whether to set a sheet as a sheet that is to be subjected to the dust detection processing is determined based on the sheet surface property 713, this is not a limiting case. For example, whether to set a sheet as a sheet that is to be subjected to the dust detection processing may be determined based on the sheet grammage 712, the shape 714, or the adjustment value 715.

The setting information for the sheet that is to be subjected to the dust detection processing and the setting information for the sheet that is not to be subjected to the dust detection processing may be preset as default settings or may be settable by the user. Alternatively, the setting information may be imported from an external device such as the PC 170.

In step S304, if the CPU 101 determines that the sheet is to be subjected to the dust detection processing (YES in step S304), the processing proceeds to step S400. Details of the dust detection processing executed in step S400 will be described below with reference to FIG. 4. On the other hand, in step S304, if the CPU 101 determines that the sheet is not to be subjected to the dust detection processing (NO in step S304), the processing proceeds to step S305.

In step S305, the CPU 101 commands a start of conveyance of the document 203 placed on the document tray 202, and then the processing proceeds to step S306.

In step S306, the CPU 101 commands the reading of an image of the conveyed document 203 with the scanner unit 111, and then the processing proceeds to step S307.

In step S307, the CPU 101 stores in the HDD 150 the image data of the document 203 read in step S306, and then the processing proceeds to step S308.

In step S308, the CPU 101 commands the discharge of the document 203 conveyed in step S305 to the document discharge tray 237, and then the processing proceeds to step S309.

In step S309, the CPU 101 determines whether all documents 203 placed on the document tray 202 are discharged to the document discharge tray 237. If the CPU 101 determines that the discharge is not completed (NO in step S309), the processing returns to step S305, and the CPU 101 executes step S305 and subsequent steps. On the other hand, if the CPU 101 determines that the discharge is completed (YES in step S309), the processing proceeds to step S310.

In step S310, the CPU 101 reads the image data stored in the HDD 150 in step S307, and then the CPU 101 commands the printing of the read image data on the sheet fed from the sheet feeding cassette or the manual feeding tray.

The foregoing describes in detail a series of processes performed by the MFP 100 according to the first exemplary embodiment to execute the copy job.

Figure 4:
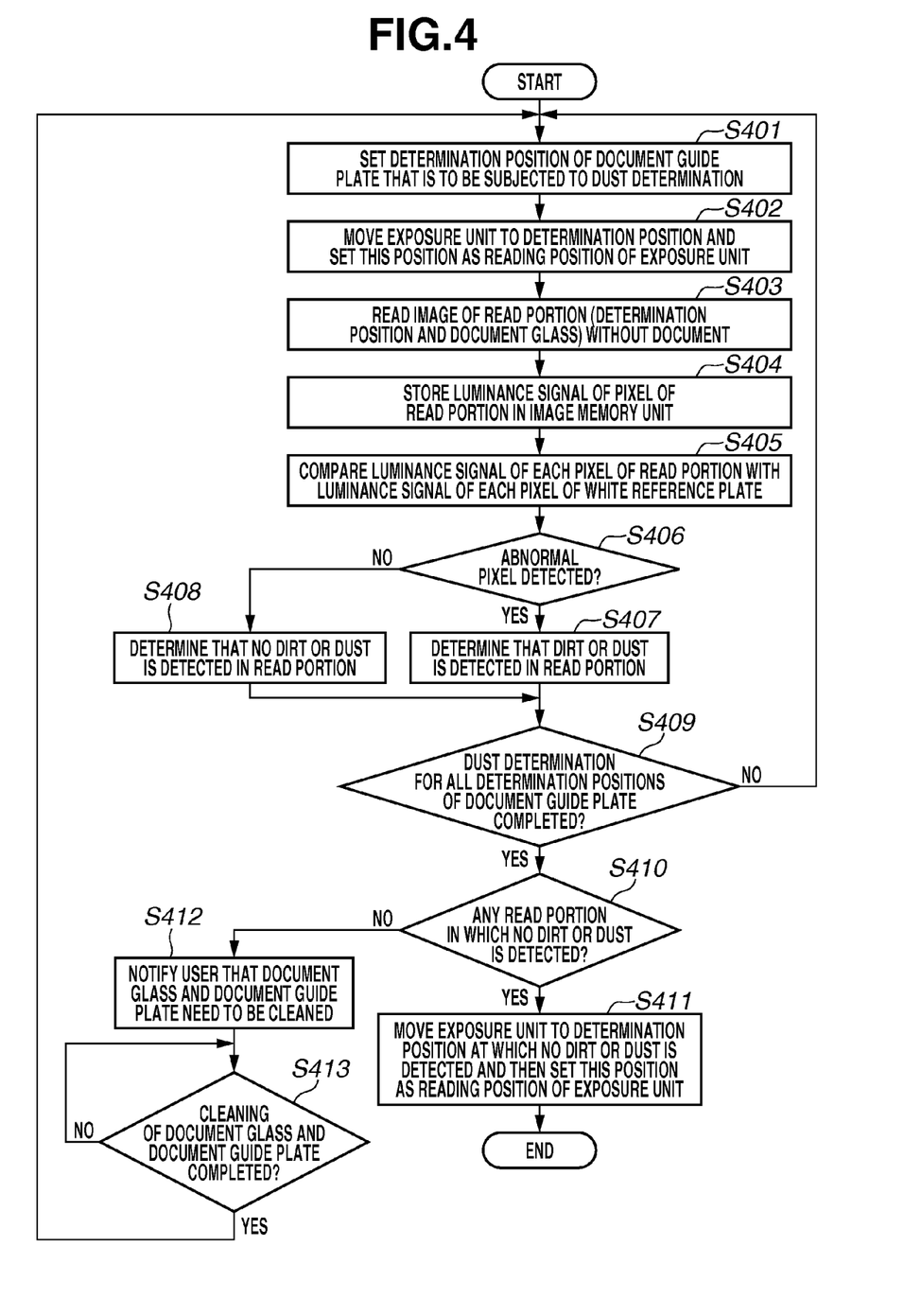
FIG. 4 is a flow chart illustrating a series of processes performed by the MFP according to the first exemplary embodiment to determine detection of dirt or dust on a member of a printing apparatus (e.g., a document glass, a document glass surface, a document guide plate, etc.).

The following describes a series of processes (step S400: dust detection processing) performed by the MFP 100 according to the first exemplary embodiment to determine detection of dirt and dust on a member of the printing apparatus, e.g., the document glass 212, a surface of the document glass 212, and/or the document guide plate 217 (hereinafter referred to as "dust determination"), with reference to a flow chart illustrated in FIG. 4. The processing illustrated in FIG. 4 is started with no document 203 being conveyed to the scanner unit 111. Each process in the flow chart illustrated in FIG. 4 is realized by the CPU 101 executing a program that is read from the ROM 102 or the HDD 150 and loaded into the RAM 104.

In step S401, the CPU 101 sets one determination position of the document guide plate 217 that is to be subjected to the dust determination, and then the processing proceeds to step S402. The first exemplary embodiment will describe below the case in which there is a plurality of determination positions of the document guide plate 217.

In step S402, the CPU 101 commands the movement of the exposure unit 213 to the one determined determination position of the document guide plate 217 that is to be subjected to the dust determination, and then the CPU 101 sets the determination position as a reading position of the exposure unit 213. Following the process performed in step S402, the processing proceeds to step S403.

In step S403, the CPU 101 commands the reading, at the reading position of the exposure unit 213 through the document glass 212, of an image of the determination position of the document guide plate 217 that is to be subjected to the dust determination, with no document on the determination position, and then the processing proceeds to step S404. In the following description, portions that are to be read (hereinafter referred to as "read portion") at the reading position of the exposure unit 213 are assumed to be the determination position of the document guide plate 217 and the document glass 212.

In step S404, the CPU 101 commands the output of luminance signals of pixels of the read portions read in step S403, and then the CPU 101 stores the output luminance signals in the image memory unit 115. Following the process performed in step S404, the processing proceeds to step S405.

In step S405, the CPU 101 reads the luminance signals of the pixels of the read portions that are stored in the image memory unit 115 in step S404, and then the CPU 101 compares the luminance signal of each pixel of the read portions with a luminance signal of each pixel of a white reference plate stored in advance in the ROM 102. If dirt or dust adheres to the determination position of the document glass 212 or the document guide plate 217, the luminance signals of the pixels of the read portions would not be continuous signals. Accordingly, the CPU 101 compares the luminance signal of each pixel of the read portions with the luminance signal of each pixel of the white reference plate, and if a luminance signal having a value that is equal to or smaller than a threshold value (hereinafter referred to as an "abnormal pixel") is detected, the CPU 101 determines that dirt or dust is detected at the position at which the abnormal pixel is detected. Following the process performed in step S405, the processing proceeds to step S406.

In step S406, the CPU 101 determines whether an abnormal pixel is detected by the comparison processing in step S405. If the CPU 101 determines that an abnormal pixel is detected (YES in step S406), the processing proceeds to step S407. In step S407, CPU 101 determines that dirt or dust is detected in the read portion of the document guide plate 217, and then the processing proceeds to step S409.

On the other hand, in step S406, if the CPU 101 determines that no abnormal pixel is detected (NO in step S406), the processing proceeds to step S408. In step S408, the CPU 101 determines that no dirt or dust is detected in the read portions, and then the processing proceeds to step S409.

In step S409, the CPU 101 determines whether execution of the dust determination for all determination positions of the document guide plate 217 that is to be subjected to the dust determination is completed.

If the CPU 101 determines that the dust determination is completed (YES in step S409), the processing proceeds to step S410. On the other hand, in step S409, if the CPU 101 determines that the dust determination is not completed (NO in step S409), the CPU 101 returns to step S401 and executes step S401 and subsequent steps. At this time, a position of the document guide plate 217 that is different from the previous determination position is set in step S401 as a determination position of the document guide plate 217 that is to be subjected to the dust determination.

In step S410, the CPU 101 determines whether there is any read portion in which no dirt or dust is detected, i.e., whether there is any determination position of the document guide plate 217 at which no dirt or dust is detected.

If the CPU 101 determines that there is a read portion in which no dirt or dust is detected (YES in step S410), the processing proceeds to step S411.

In step S411, the CPU 101 commands the movement of the exposure unit 213 to the determination position of the document guide plate 217 that is determined in step S408 as a determination position at which no dirt or dust is detected, and then the CPU 101 sets the position as the reading position of the exposure unit 213. In this way, when reading an image of the document 203, reading of a shadow of dirt or dust as an image can be prevented thereafter. Following the process performed in step S411, a series of processes for the dust determination end.

On the other hand, in step S410, if the CPU 101 determines that there is no read portion in which no dirt or dust is detected (NO in step S410), the processing proceeds to step S412. In step S412, the CPU 101 notifies the user that the abnormal pixel (i.e., dirt or dust on the document glass 212 or the document guide plate 217) is detected and that the document glass 212 and the document guide plate 217 need to be cleaned, and then the processing proceeds to step S413. The reason for notifying the user of the need for the cleaning of the document glass 212 and the document guide plate 217 in step S412 is that since dirt or dust is detected in every read portion, a shadow of the dirt or dust may be read as an image when reading an image of the document 203.

Figure 8:
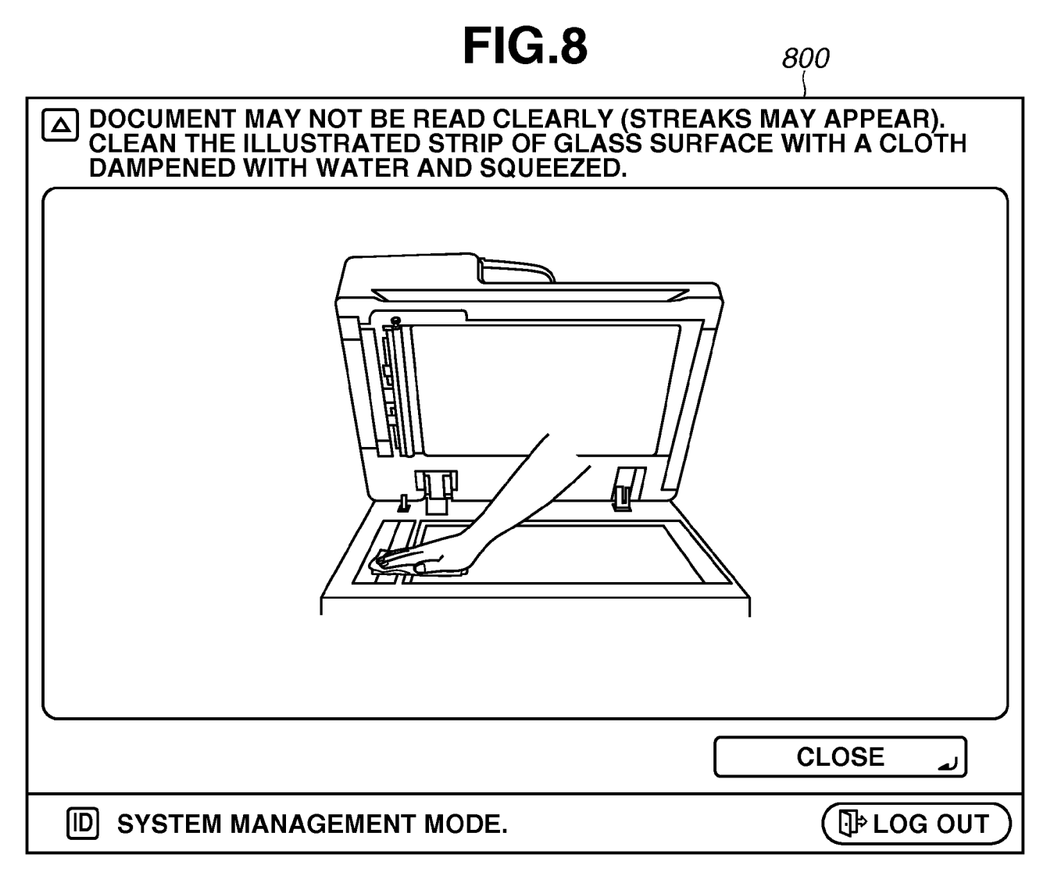
FIG. 8 illustrates an example of a notification screen, displayed on the MFP according to the first exemplary embodiment, for notifying a user that a document glass surface needs to be cleaned.

In step S412, the CPU 101 displays, for example, a notification screen 800 illustrated in FIG. 8 on the operation unit 160 to notify the user that a surface of the document glass 212 needs to be cleaned. To notify the user of the need for the cleaning of the document guide plate 217, the CPU 101 may display the same screen as the notification screen 800 or may further display another screen on the operation unit 160. Alternatively, the user may be notified of the need for the cleaning of the document glass 212 and the document guide plate 217 by sound or light.

In step S413, the CPU 101 determines whether the cleaning of the document glass 212 and the document guide plate 217 is completed. If the CPU 101 determines that the cleaning is completed (YES in step S413), the CPU 101 returns to step S401 and executes step S401 and subsequent steps to execute a series of processes for the dust determination again after the completion of the cleaning. On the other hand, if the CPU 101 determines that the cleaning is not completed (NO in step S413), the CPU 101 repeats the process of step S413 until the cleaning is completed. Completion of the cleaning of the document glass 212 and the document guide plate 217 is detected in response to the close of a pressing plate 201 after the open of the pressing plate 201 for cleaning. Alternatively, completion of the cleaning of the document glass 212 and the document guide plate 217 may be detected in response to a cleaning completion button (not illustrated) being pressed by the user on the notification screen 800 illustrated in FIG. 8.

The foregoing describes in detail a series of processes for the dust determination performed by the MFP according to the first exemplary embodiment. While the first exemplary embodiment describes the case in which the CPU 101 repeats execution of the processes of steps S401 to S409 for every determination position of the document guide plate 217 that is to be subjected to the dust determination, this is not a limiting case. Alternatively, in step S408, if the CPU 101 determines that no dirt or dust is detected in the read portion, the processing may directly proceed to step S411. Then, in step S411, the CPU 101 commands the movement of the exposure unit 213 to the determination position of the document guide plate 217 at which no dirt or dust is detected. Thereafter, the CPU 101 sets the determination position as the reading position of the exposure unit 213 and then, a series of processes for the dust determination may be ended.

As the foregoing describes, in the first exemplary embodiment, after the copy job execution command is received, the attribute information about the sheet to be used in printing is acquired, and whether to execute the dust detection processing is controlled according to the acquired attribute information about the sheet. In this way, the user can perform switching so that the dust detection processing is executed if the user desires execution of the printing without an effect of an abnormal pixel caused by dirt or dust on the document glass 212, or the dust detection processing is not executed if the user desires prompt reading of the document.

While the first exemplary embodiment describes the case in which the dust detection processing is executed before the document 203 is conveyed if the sheet to be used in printing is determined to be subjected to the dust detection processing, this is not a limiting case. Alternatively, the dust detection processing may be executed after the reading of all documents 203 placed on the document tray 202 is completed. Alternatively, the dust detection processing may be executed between the readings of the plurality of documents 203 placed on the document tray 202. Further, these timings of the execution of the dust detection processing may be combined, or the timing of the execution of the dust detection processing may be set separately according to the attribute information of the sheet.

In the first exemplary embodiment described above, after the copy job execution command is received, the attribute information about the sheet to be used in printing is acquired, and whether to execute the dust detection processing is controlled according to the acquired attribute information about the sheet.

On the other hand, a second exemplary embodiment will describe the case of controlling whether to execute the dust detection processing according to a reading mode of the document such as a speed priority mode and an image quality priority mode in addition to controlling whether to execute the dust detection processing according to the attribute information about the sheet to be used in printing.

A flow chart of a series of processes for determining detection of dirt and dust on the document glass 212 and the document guide plate 217 according to the second exemplary embodiment is similar to the flow chart illustrated in FIG. 4. Thus, description thereof is omitted.

Figure 9:
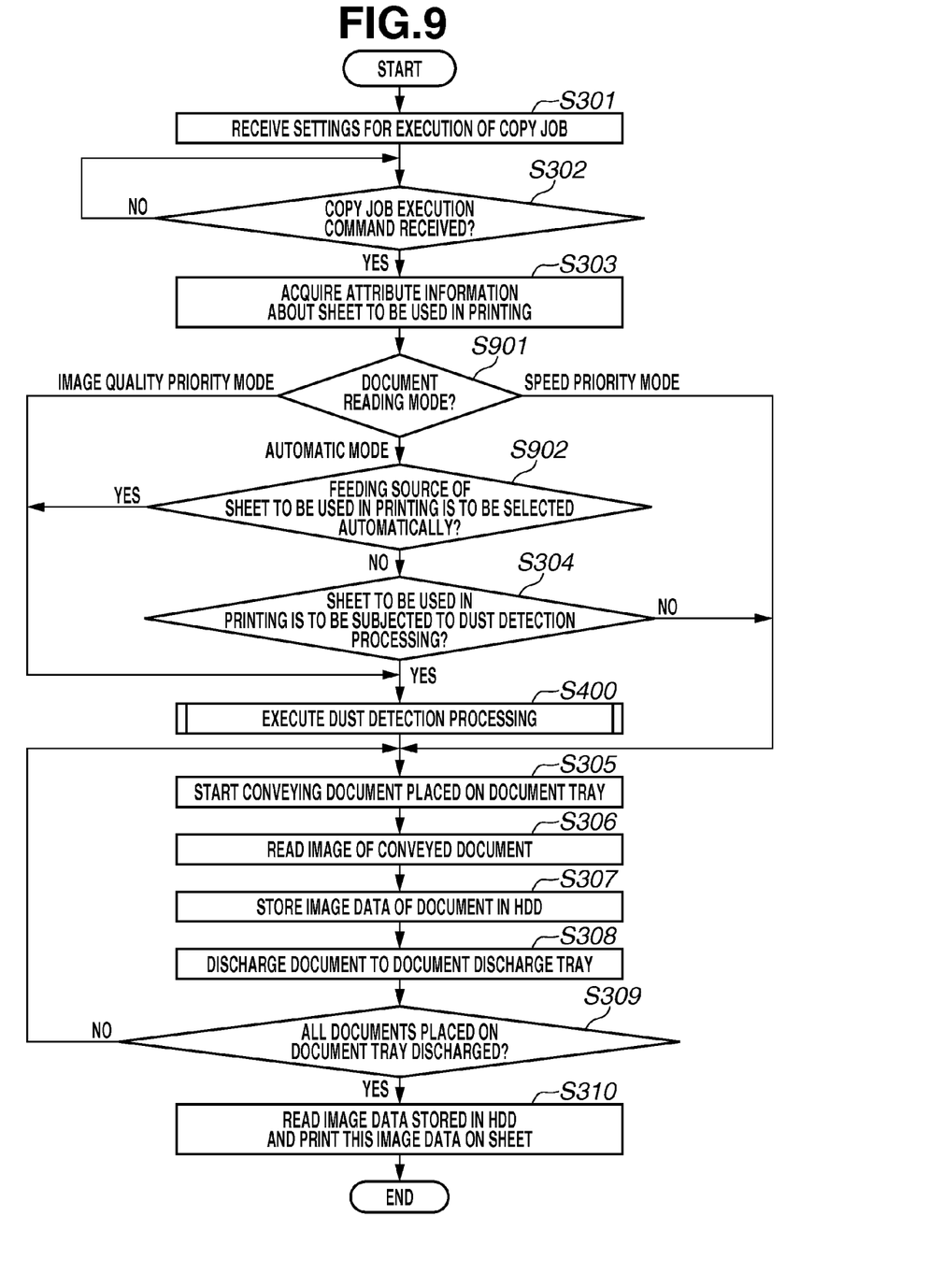
FIG. 9 is a flow chart illustrating a series of processes performed by an MFP according to a second exemplary embodiment to execute a copy job.

In the second exemplary embodiment, some of the operations performed in a series of processes for the execution of the copy job are different from those in the first exemplary embodiment. Thus, operations that are similar to those in the flow chart in FIG. 3 according to the first exemplary embodiment are assigned the same step numbers, and detailed description thereof is omitted. Operations that are different from those in the first exemplary embodiment will be mainly described, with reference to a flow chart illustrated in FIG. 9. Each process in the flow chart illustrated in FIG. 9 is realized by the CPU 101 executing a program that is read from the ROM 102 or the HDD 150 and loaded into the RAM 104. The processing illustrated in FIG. 9 is started with a speed priority mode 1001, an image quality priority mode 1002, or an automatic mode 1003 being selectively set, as a reading mode of the document, on a reading setting screen 1000 illustrated in FIG. 10.

Figure 10:
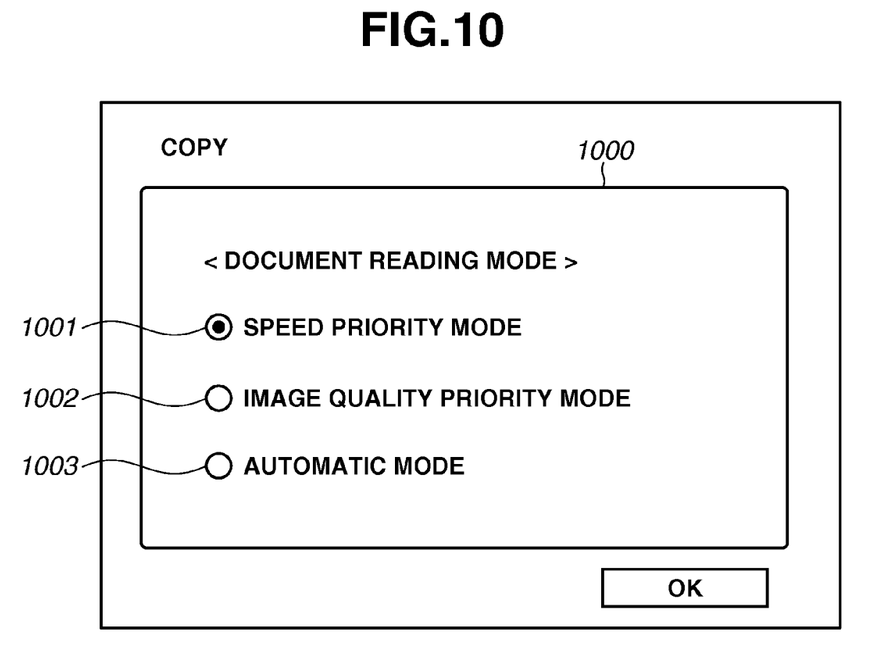
FIG. 10 illustrates an example of a reading setting screen, displayed on the MFP according to the second exemplary embodiment, for setting a reading mode of a document.

The speed priority mode 1001 is a reading mode in which the dust detection processing is not performed when a document is read to prioritize speed over image quality. On the other hand, the image quality priority mode 1002 is a reading mode in which the dust detection processing is performed when a document is read to prioritize image quality over speed. On the yet other hand, the automatic mode 1003 is a mode in which, when a document is read, the speed is the same as that in the speed priority mode 1001, but whether to execute the dust detection processing is controlled according to attribute information about a sheet to be used in printing.

In step S303, the CPU 101 executes a copy job to acquire attribute information about a sheet to be used in the printing of image data generated by reading a document, and then the processing proceeds to step S901.

In step S901, the CPU 101 determines whether the document reading mode that is set on the reading setting screen 1000 illustrated in FIG. 10 is the speed priority mode 1001, the image quality priority mode 1002, or the automatic mode 1003.

If the CPU 101 determines that the reading mode is the speed priority mode 1001 (SPEED PRIORITY MODE in step S901), the processing proceeds to step S305, and the CPU 101 executes step S305 and subsequent steps. On the other hand, if the CPU 101 determines that the reading mode is the image quality priority mode 1002 (IMAGE QUALITY PRIORITY MODE in step S901), the processing proceeds to step S400, and the CPU 101 executes step S400 and subsequent steps. On the yet other hand, the CPU 101 determines that the reading mode is the automatic mode 1003 (AUTOMATIC MODE in step S901), the processing proceeds to step S902.

In step S902, the CPU 101 determines whether a feeding source (sheet feeding mode) of a sheet to be used in printing that is selectively set on the sheet feeding setting screen 610 illustrated in FIG. 6B is the automatic feeding selection 611. If the CPU 101 determines that the sheet feeding mode is the automatic feeding selection 611 (YES in step S902), the processing proceeds to step S400, and the CPU 101 executes step S400 and subsequent steps. On the other hand, in step S902, if the CPU 101 determines that the sheet feeding mode is not the automatic feeding selection 611 (NO in step S902), the processing proceeds to step S304, and the CPU 101 executes step S304 and subsequent steps.

If the sheet feeding mode is the automatic feeding selection 611, regardless of whether the sheet to be used in printing is to be subjected to the dust detection processing, the dust detection processing of step S400 is always executed because of the following reason.

In the automatic feeding selection 611, the document 203 placed on the document tray 202 is conveyed by a predetermined amount in a sub-scanning direction so that the document size is fixed, whereby the feeding source of the sheet to be used in printing is determined. More specifically, as the document 203 is conveyed, each roller is rotated to cause the document 203 to reach the reading position of the exposure unit 213, and the reading of an image of the document 203 is started. Thus, the dust detection processing cannot be executed before the reading of an image of the document. Accordingly, in the case of the automatic feeding selection 611, the dust detection processing is executed before the conveyance of the document 203 placed on the document tray 202 is started.

The foregoing describes in detail a series of processes performed by the MFP 100 according to the second exemplary embodiment to execute the copy job. While the second exemplary embodiment describes the case in which the dust detection processing is executed before the document 203 is conveyed if in step S901 the CPU 101 determines that the reading mode is the image quality priority mode 1002, or if in step S902 the CPU 101 determines that the sheet feeding mode is the automatic feeding selection 611, this is not a limiting case. Alternatively, the dust detection processing may be executed after the reading of all documents 203 placed on the document tray 202 is completed. Alternatively, the dust detection processing may be executed between the reading of a plurality of documents 203 placed on the document tray 202. Further, these timings of the execution of the dust detection processing may be combined, or the timing of the execution of the dust detection processing may be set separately according to the attribute information of the sheet.

As the foregoing describes, in the second exemplary embodiment, whether to execute the dust detection processing is controlled according to a reading mode of the document such as a speed priority mode and an image quality priority mode in addition to controlling whether to execute the dust detection processing according to the attribute information about the sheet to be used in printing. As a result, the user can perform switching so that the dust detection processing is executed if the user desires execution of the printing without an effect of an abnormal pixel caused by dirt or dust on the document glass 212 and the document guide plate 217, or the dust detection processing is not executed if the user desires prompt reading of the document.

The present invention is not limited to the exemplary embodiments described above, and various modifications (including organic combinations of the exemplary embodiments) can be made within the spirit of the present invention and are not excluded from the scope of the invention.

For example, while the present exemplary embodiment describes the case in which an image of a document placed on the document tray 202 is read on the document glass 212, the present invention is similarly applicable to the case in which an image of a document placed on a document platen 221 is read on a platen glass 220, as well.

Further, for example, while the CPU 101 of the controller unit 107 of the MFP 100 performs the various types of control in the present exemplary embodiment, an external print control apparatus that is in a separate housing from the MFP 100 such as an external controller may be configured to execute part or all of the various types of control.

While the foregoing describes various examples and exemplary embodiments of the present invention, it should be apparent to a person skilled in the art that the spirit and scope of the present invention is not limited to a particular description in the present specification.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-216481 filed Oct. 17, 2013, which is hereby incorporated by reference herein in its entirety.

What is claimed is:

1. A printing apparatus comprising:
a reading unit configured to perform reading at a reading position and then to generate image data;
a printing unit configured to print an image on a sheet based on the image data generated by the reading unit;
a determining unit configured to determine whether image data includes an abnormal pixel, the image data being generated by the reading unit with no document placed at the reading position; and
a control unit configured to control the determining unit to perform the determination in a case where a type of the sheet on which the image is to be printed by the printing unit is a first type of sheet, and to control the determining unit not to perform the determination in a case where the type of the sheet on which the image is to be printed by the printing unit is a second type of sheet which is different from the first type of sheet.

2. The printing apparatus according to claim 1, wherein the control unit controls the determining unit to perform the determination in a case where the sheet on which the image is to be printed by the printing unit is not set before the reading unit performs reading of the document.

3. The printing apparatus according to claim 1, further comprising a setting unit configured to set the first type.

4. The printing apparatus according to claim 1, further comprising a convey unit configured to convey the document, wherein the determining unit performs the determination before the convey unit conveys the document to the reading position.

5. The printing apparatus according to claim 1, further comprising a notification unit configured to notify a user that the abnormal pixel is detected in a case where the determining unit determines that image data includes the abnormal pixel, the image data being generated by the reading unit with no document placed at the reading position.

6. The printing apparatus according to claim 5, wherein the notification unit further notifies the user that a member of the printing apparatus that is to be read by the reading unit needs to be cleaned.

7. The printing apparatus according to claim 1, wherein the abnormal pixel is caused by dirt or dust on a member of the printing apparatus that is to be read by the reading unit.

8. The printing apparatus according to claim 1, further comprising a setting unit configured to set the second type.

9. The printing apparatus according to claim 1, wherein the type of the sheet on which the image is to be printed by the printing unit includes a surface property of a sheet.

10. The printing apparatus according to claim 1, wherein the type of the sheet on which the image is to be printed by the printing unit includes a grammage of the sheet.

11. The printing apparatus according to claim 1, wherein the type of the sheet on which the image is to be printed by the printing unit includes a shape of the sheet.

12. The printing apparatus according to claim 1, wherein the first type of sheet is a coated sheet.

13. The printing apparatus according to claim 1, wherein the first type of sheet is film.

14. The printing apparatus according to claim 1, wherein the second type of sheet is thick paper or recycled paper.

15. A method for controlling a printing apparatus including a reading unit and a printing unit, the method comprising:
   performing, by the reading unit, reading at a reading position and then generating, by the reading unit, image data;
   printing, by the printing unit, an image on a sheet based on the image data generated by the reading unit;
   determining whether image data includes an abnormal pixel, the image data being generated by the reading unit with no document placed at the reading position; and
   performing control so that the determining is performed in a case where a type of the sheet on which the image is to be printed by the printing unit is a first type of sheet, and performing control so that the determining is not performed in a case where the type of the sheet on which the image is to be printed by the printing unit is a second type of sheet which is different from the first type of sheet.

16. A non-transitory computer-readable storage medium storing a computer program for controlling a printing apparatus including a reading unit and a printing unit to perform a method, the method comprising:
   performing, by the reading unit, reading at a reading position and then generating, by the reading unit, image data;
   printing, by the printing unit, an image on a sheet based on the image data generated by the reading unit;
   determining whether image data includes an abnormal pixel, the second-image data being generated by the reading unit with no document placed at the reading position; and
   performing control so that the determination is performed in a case where a type of the sheet on which the image is to be printed by the printing unit is a first type of sheet, and performing control so that the determination is not performed in a case where the type of the sheet on which the image is to be printed by the printing unit is a second type of sheet which is different from the first type of sheet.

* * * * *